Dec. 27, 1966  D. L. HUNT  3,294,119
FLUID VALVE
Filed April 3, 1964   2 Sheets-Sheet 1
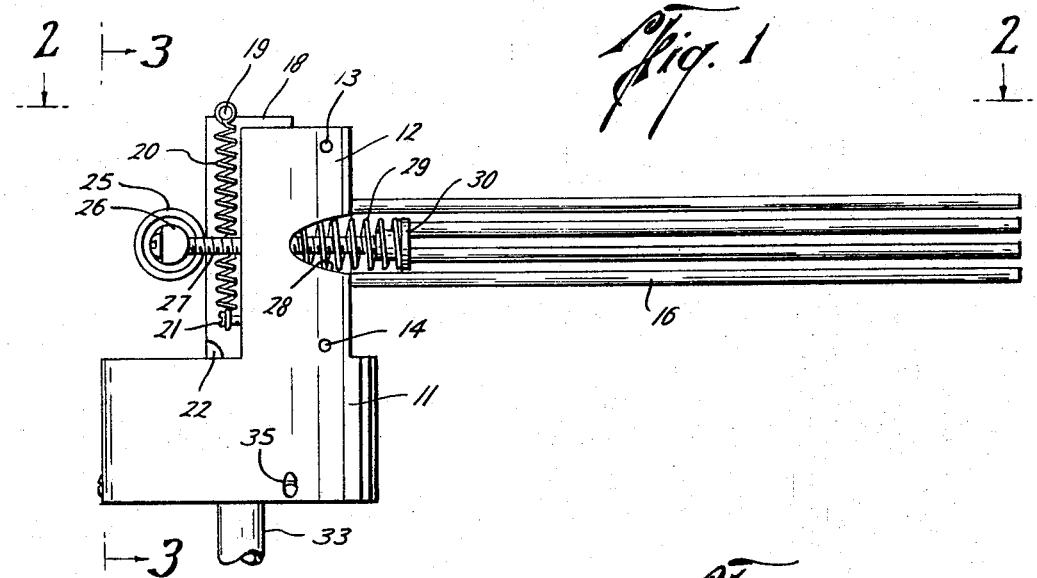
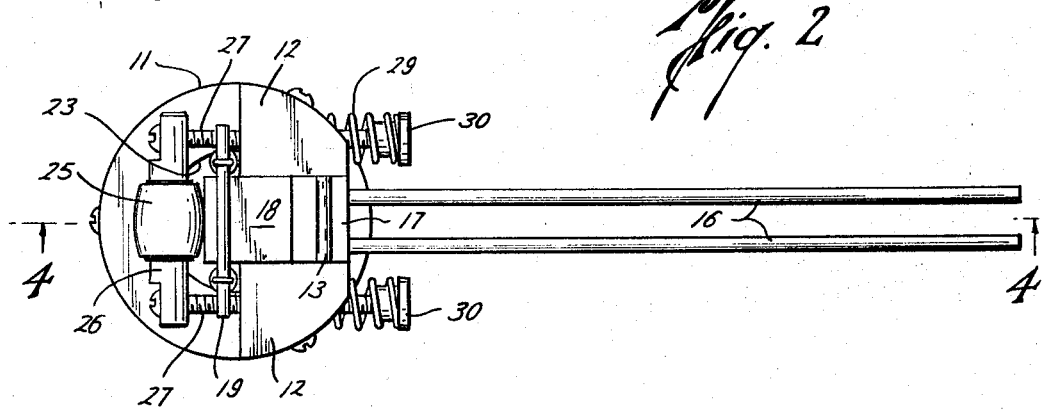
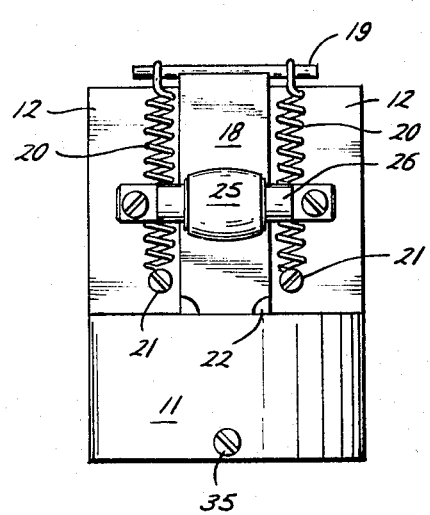
David Lavon Hunt
INVENTOR.
BY *Eugene S. Codden*
ATTORNEY Dec. 27, 1966  D. L. HUNT  3,294,119
FLUID VALVE
Filed April 3, 1964  2 Sheets-Sheet 2
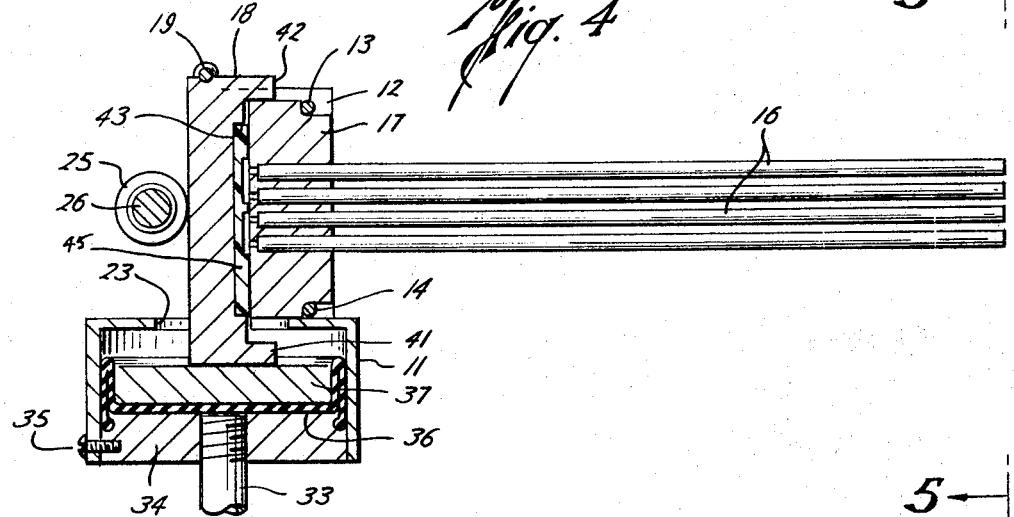
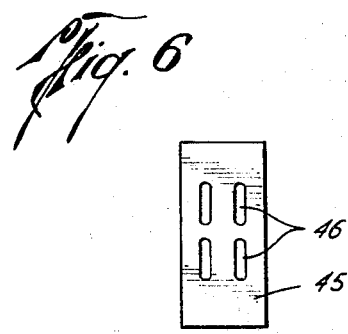
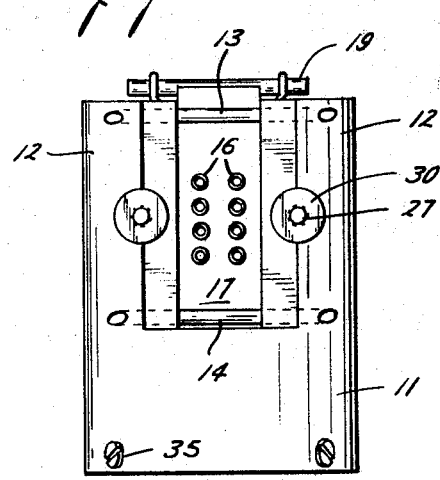
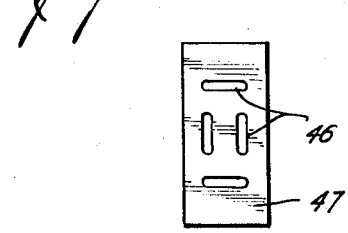
David Lavon Hunt
INVENTOR.
BY
ATTORNEY

United States Patent Office 3,294,119
Patented Dec. 27, 1966

3,294,119
FLUID VALVE
David Lavon Hunt, P.O. Box 12021,
Houston, Tex. 77017
Filed Apr. 3, 1964, Ser. No. 357,100
6 Claims. (Cl. 137—625.48)

This invention relates to a valve for controlling the passage of fluid through a plurality of conduits. More particularly, the invention relates to a sampling valve for use in certain testing arts such as chromatography wherein small quantities of gases are fed through conduits leading to portions of the testing instrument.

There has long been need for a sampling valve of the type herein taught which would not require any lubrication and which at the same time would largely prevent any escape of the gas to atmosphere. The use of a lubricant is not usually desirable with a valve of this type because a lubricant would tend to foul or otherwise clog the small conduits used to bring the gas samples through the valve. Moreover, the lubricant may react with certain of the gases to provide undesirable residues. Furthermore, the valve must be constructed of a material such that the valve will not readily corrode or otherwise become inoperable. At the same time, the valve must provide accurate and quick control over the flow of gases through the various conduits and require a minimum of maintenance over long periods of time. Since lubrication is eliminated, the parts must be carefully designed and assembled such that the valve will exercise proper control under the foregoing circumstances.

The art of chromatography in analysing gas and vapor products in plants has developed rapidly in the last few years with many improvements occuring quite recently, necessitating a valve of the described characterestics.

It is therefore an objective of this invention to provide an improved valve for controlling the passage of fluids through conduits wherein there is a minimum loss of gas to the atmosphere and wherein no lubricant is required for the successful operation of the valve.

It is another objective of this invention to provide an improved valve for use in certain sampling instruments wherein small quantities of gases are controllably delievered through connecting conduits.

A still further objective of this invention is to provide an improved valve for alternately redirecting the flow of small quantities of gases through a plurality of connecting conduits wherein the valve head and the valve seat are biased into such pressure contact as to virtually eliminate loss of gases to the atmosphere and with a minimum of pressure drop in the conduits.

These and other objectives of this invention will be obvious by reference to the description herein.

Briefly stated, the valve is comprised of a body member having a lower portion to which is attached at the upper side thereof two projections which are spaced apart and form a slot therebetween. A valve block is removably secured in the slot and has a plurality of small tubes or conduits, connected to the front side thereof. These conduits extend through the valve block to the back side thereof, and are for the purpose of conducting fluids, such as gas, therethrough.

The back side of the valve block is flat and has a uniform and preferably smooth polished surface.

The valve has a valve head which is adapted and shaped for close pressure contact with and linear sliding engagement against the back side of the valve block. The front side of this valve head is provided with a recess in which a plate of abrasive resistent material such as a plate of Teflon is mounted. The front side of the Teflon plate has a plurality of valve ports which are so arranged as to connect up two or more of the conduit openings in the back of the valve block when in one position and to close off said conduits when the Teflon plate is shifted linearly either up or down.

There is also provided a resilient biasing means for urging the valve and the Teflon plate against the back side of the valve block in fluid tight relationship. By having this fluid tight relationship, it is obvious that the surface of the backside of the valve block and the Teflon plate must be smoothly finished so as to provide the proper seal therebetween and at the same time provide a smooth relatively friction free surface to facilitate the oscillation of the valve head with respect to the valve block.

Means are also provided for reciprocating or oscillating the valve head linearly with respect to the valve block at predetermined intervals. By having the biasing means urging the valve head and Teflon plate against the backside of the valve block so arranged as to reduce the friction to a minimum, the operation of the reciprocating means is much more efficient and accurate and requires less maintenance and care.

Reference to the drawings will further explain the invention herein, and in which:

FIG. 1 is a side elevation view of one embodiment of the invention herein. For purposes of convenience the right side of the valve as shown in FIG. 1 will be generally referred to as the front side of the valve and the left side will be generally referred to as the backside. Similarly, the top portion of the valve shown in FIG. 1 will be referred to as the top of the valve and the bottom portion of the valve shown in FIG. 1 will be referred to as the bottom side, although it is to be understood that the valve may be disposed in any number of positions in actual use.

FIG. 2 is a top plan view of the valve as shown in FIG. 1 and taken at line 2—2 thereof.

FIG. 3 is a rear or back elevation view taken at line 3—3 of FIG. 1.

FIG. 4 is the central vertical sectional view taken at line 4—4 of FIG. 2.

FIG. 5 is a front elevation view taken at line 5—5 of FIG. 4.

FIG. 6 is a front view of the Teflon plate as it would appear in the disassembled condition.

FIG. 7 is a front view of an alternative embodiment of the Teflon plate of the type shown in FIG. 6.

Referring to FIG. 1, there it will be observed that the valve is formed with body 11, the lower portion of which is generally cylindrical in shape and is formed with two spaced apart and upwardly extending projections 12 and having pins 13 and 14 passing transversely therethrough and connecting therebetween. A plurality of conduits 16 lead into and attach to valve block 17, which is positioned in the slot formed between upper projections 12 as best seen in FIG. 2.

Positioned immediately behind valve block 17 is valve head 18 which is square in plan view and extends downwardly into the bottom portion of body 11 as seen in FIGS. 1 and 3. Valve head 18 is biased downwardly by means of retaining pin 19 which is lodged in a recess across the top of valve head 18. Retaining pin 19 extends out on both sides of valve head 18 and each end is secured to an expansion spring 20, each of which is secured to a projection 12 by a screw 21. Hence, the springs 20 normally bias valve head 18 downwardly. The lower end of valve head 18 is provided with notches 22 on the back corners thereof so that the lower end of valve head 18 will fit through annular opening 23 provided in the lower portion of body member 11 as best seen in FIG. 2.

Valve head 18 is also biased against the back side of valve block 17 in pressure contact by means of roller 25 which is mounted by roller bearings on roller pin 26. Pin 26 is held in biasing engagement by means of a pair of screws or bolts 27, one of which passes through each end of roller pin 26 and thence through an upward projection 12, the front edges of which are each provided with an annular recess 28 which provides a seating for a pressure spring 29 which is held in position by nuts 30 threaded on the end of each bolt 27. Thus, it will be observed that the amount of pressure applied by roller 25 can be adjusted by the amount or distance which nuts 30 are screwed upon bolts 27 and by the compression strength of springs 29. Since roller 25 is mounted by suitable bearings on roller pin 26, there will be a minimum of friction between roller 25 and valve head 18 during the reciprocation or oscillation of valve head 18 up and down.

The bottom portion of body 11 is shown in FIG. 1 with air pressure tube 33 entering thereinto. Tube 33 is threadably connected to base plate 34 which is annular in shape and fits in the bottom portion of body 11, as best seen in FIG. 4, and is held therein by screws 35. A rubber lining 36 is attached around the upper edge of base plate 34 in the shape of a U, whereby a chamber is formed between lining 36 and base plate 34. Positioned inside of the U formed by lining 36 is an annular disc which is shown as piston 37, top edge of which supports the lower end of valve head 18.

The bottom end of valve head 18 is also provided with a lower lug 41 which is attached to the front side thereof and which is designed to engage the lower end of valve block 17 when valve head 18 is moved upwardly and thereby limits the upward movement thereof. The top end of valve head 18 is also provided with an upper lug 42 on the front side thereof which contacts the top end of valve block 17 and is resiliently held there by springs 20, except when valve head 18 is moved upwardly.

During operation of the valve, and at predetermined intervals, air pressure is applied through tube 33, which will cause rubber lining 36 to expand upwardly, thus forcing piston 37 upwardly against the lower end of valve head 18 and causing valve head 18 to be reciprocated linearly upward. When air pressure is relieved on tube 33, valve head 18 will be biased back down by springs 20. Lower lug 41 limits the upward movement of valve head 18 and upper lug 42 limits the downward movement. Hence, valve head 18 is designed to be reciprocated linearly up and down within defined limits at predetermined intervals. By being so designed, the valve can be operated at extremely high speeds and with great accuracy and control.

As shown in FIG. 4, the front side of valve head 18 is provided with a recess 43 which is rectangular in shape in which recess a plate of abrasive resistant material such as Teflon plate 45 is inserted. Plate 45 is held in the recess 43 of valve head 18 by the pressure applied by roller 25 against the backside of valve head 18. Hence, plate 45 is held in fluid tight relationship with the back side of valve block 17.

The front side of plate 45 is provided with notches or valve ports 46, as shown in FIGS. 4 and 6. There will be seen that there are four valve ports 46 which connect four pairs of conduits when in the position as shown in FIG. 4. When valve head is forced upwardly by action of air pressure through tube 33, it will be observed that ports 46 move above the lower conduit of each pair of conduits, hence stopping or redirecting the flow of fluids or gases through the conduits until air pressure is relieved and valve head 18 is biased downwardly again. Other forms of ports may be used in other alternative arrangements, such as that shown in FIG. 7, where alternate plate 47 is shown with two horizontal ports and two vertical ports with the result that different pairs of conduits may be connected and controlled by the valve. The principle of operation is the same, however, it is obvious that the ports 46 could be so arranged to connect two or more conduits in a raised position and connect different ones in the lower position, depending upon the convenience of operation.

Referring to FIGS. 4 and 5, it will be seen that conduits 16 are attached to valve block 17 and enter into and form passages therethrough to the backside of valve block 17 as explained above. Valve block 17 is removably held in body 11 by being positioned between pins 13 and 14 which hold valve block 17 from forward movement, and by valve head 18, which is pressed against the back side thereof. During disassembly of the tool, valve block 17 can be removed by first removing valve head 18. This permits a different type valve block to be inserted in the body for different uses, as for example, where only four conduits are used to enter valve block 17, or some other number.

Thus, there is provided a great variety of alternatives which are possible with this valve, which alternatives are available by either switching valve block 17 to an alternate block with a different arrangement of conduits leading thereinto, and/or by changing plate 45, such as by using alternate plate 47 whereby different conduits may be connected and thereby controlled.

The flow of gases or other fluids through conduits 16 is thus controlled by the arrangement of the ports in Teflon plate 45 and the action of valve head 18 in reciprocating up and down to alternately open and close communication between certain of the conduits 16.

Thus, it will be observed that the art has been provided with a novel and highly successful valve for use in controlling fluid passage through a plurality of small conduits. No lubrication is required for this valve and the valve is so constructed as to prevent any substantial loss of gas to the atmosphere. The valve is simple in design and operation, thereby reducing maintenance problems to a minimum. The biasing means which keeps the valve parts in fluid tight pressure contact is relatively friction free, hence improving operation of the valve.

Further modifications may be made in the invention as particularly described without departing from the scope of the invention. Accordingly, the foregoing description is to be construed illustratively only and is not to be construed as a limitation upon the invention as defined in the following claims.

What is claimed is:
1. In a valve for controlling the passage of fluid through conduits, the combination comprising:
    a body member having
        a lower portion and
        two spaced apart upper projections attached to said lower portion and forming a slot therebetween.
    a valve block removably secured in said slot and having
        a plurality of conduits connected to the front side thereof and communicating therethrough to the back side thereof, for conducting pressurized fluids therethrough, said back side having a flat and uniform surface,
    a valve head adapted for close pressure contact with
        a first resilient biasing means for urging said valve block, said valve head having lugs attached to the upper and lower ends thereof for engaging said valve block and limiting the length of said linear reciprocation, and having a recess provided in the front side of said valve head,
        an abrasive resistant plate mounted in said recess, with said plate having a plurality of valve ports on the front side thereof for alternately closing and opening fluid passage through preselected ones of said conduits,
        a first resilient biasing means for urging said valve head and said plate against said back side of said valve block, and
        means for reciprocating said valve head linearly with respect to said valve block at preselected intervals.

2. The apparatus as claimed in claim 1 wherein:
said first resilient biasing means comprises a roller held in biasing contact with the rear side of said valve head.

3. The apparatus as claimed in claim 1 wherein:
said means for reciprocating said valve head includes
- a fluid pressure actuated piston mounted in said lower portion of said housing and contacting the lower end of said valve head, for moving said valve head upward at predetermined intervals, and
- a second biasing means connected to the top of said valve head for normally biasing said valve head downward when said piston is not actuated.

4. The apparatus as claimed in claim 2 wherein:
said roller is mounted on a pin, the axis of which is transverse to the direction of reciprocation of said valve head, and including
- a pair of bolts, each of which is attached to one end of said pin and extend through an opening in one of said upper projections, and having
- a pair of compression springs connected to said bolts and seating in recesses provided in the front sides of said projections,
whereby said compression springs resiliently bias said roller against the rear side of said valve head.

5. The apparatus as claimed in claim 4 wherein:
said second biasing means includes
- a bias pin mounted in a recess across the top of said valve head, and
- a pair of expansion springs, each of which is attached to said bias pin at one end and to a portion of said body member at the other end.

6. In a valve for controlling the passage of gases through conduits, the combination comprising:
a boby member having
- a lower portion and
- two spaced apart upper projections attached to said lower portion and forming a slot therebetween, a valve block removably secured in said slot and having
- a plurality of conduits connected to the front side of said block and communicating therethrough to the back side of said block, for conducting gas therethrough at predetermined intervals, said back side having a flat and uniform surface, a valve head adapted for close pressure contact with and linear sliding against said back side of said valve block and having
- a recess provided in the front side thereof,
- an abrasive resistant plate mounted in said recess, with said plate having a plurality of valve ports in the front side thereof, for alternately closing and opening gas flow through preselected ones of said conduits,
- a first resilient biasing means having a roller held in biasing engagement with the rear side of said valve head, for urging said valve head and said plate against the back side of said valve block, and means for reciprocating said valve head up and down with respect to said valve block at preselected intervals and including
- an air actuated piston mounted in said lower portion of said body member and contacting the lower end of said valve head, and
- a second resilient biasing means connected to the top of said valve head for normally biasing said valve head downward when said piston is not actuated.

References Cited by the Examiner

UNITED STATES PATENTS

| | | | |
|---|---|---|---|
| 828,280 | 8/1906 | Firey | 251—176 |
| 1,923,157 | 8/1933 | McCune | 251—176 XR |
| 2,337,022 | 12/1943 | Beiderman | 251—176 XR |
| 2,889,569 | 6/1959 | Riester | 251—176 XR |

M. CARY NELSON, *Primary Examiner.*

EDWARD FEIN, *Assistant Examiner.*